United States Patent Office 3,267,368
Patented August 16, 1966

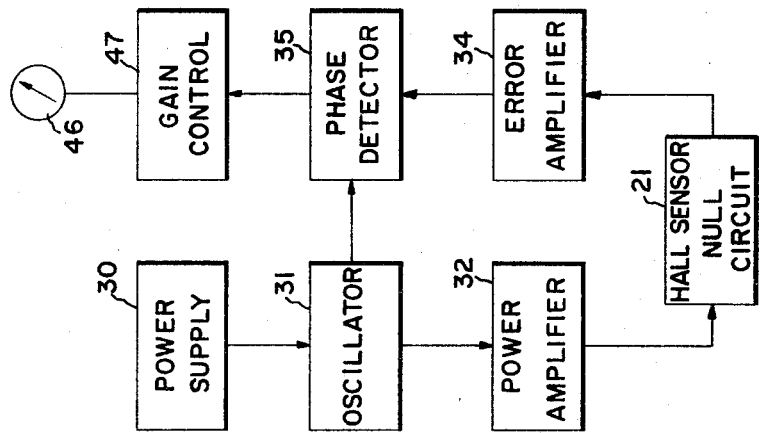
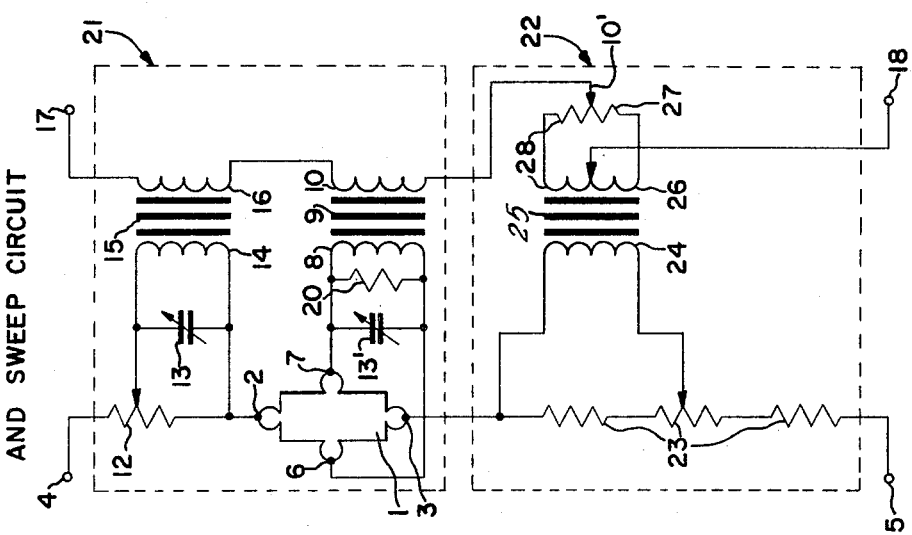
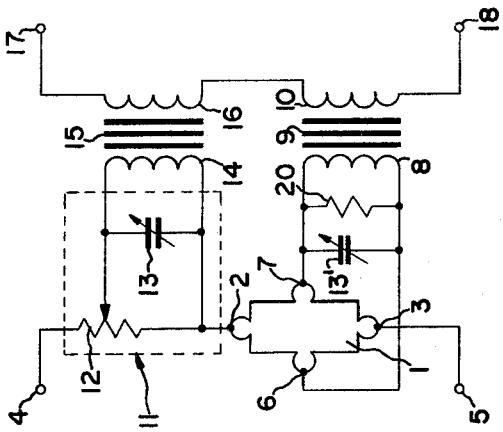

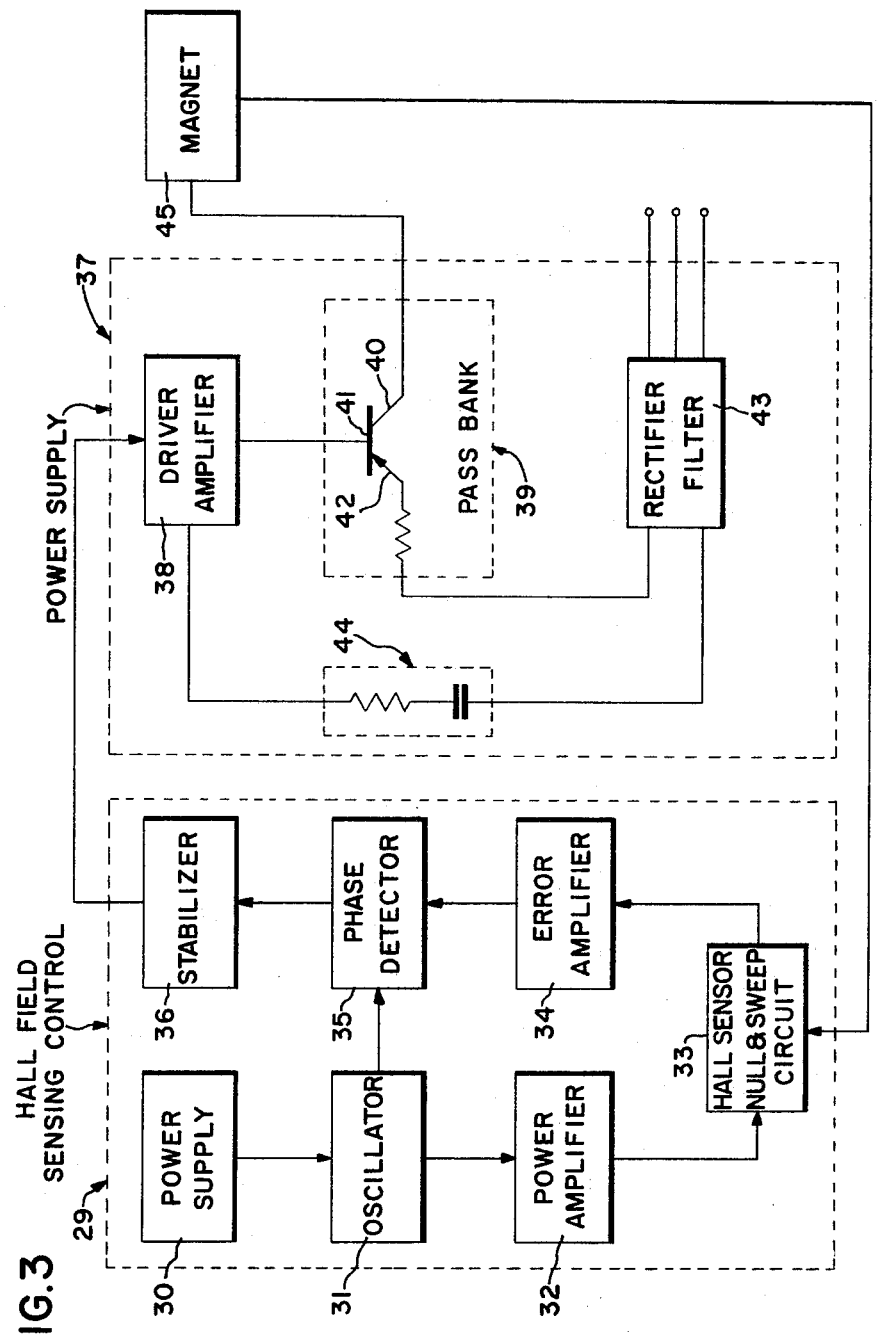

3,267,368
MAGNETIC FIELD SENSING DEVICE
John V. Rock and David L. Wright, Palo Alto, Calif., assignors to Varian Associates, Palo Alto, Calif., a corporation of California
Filed Jan. 21, 1963, Ser. No. 252,939
19 Claims. (Cl. 324—45)

The present invention relates in general to magnetic field measurement and regulation, and in particular to novel apparatus for sensing the strength of a magnetic field suitable either for regulating or measuring the magnetic field strength with a very high degree of reproducible accuracy.

It is well known that the strength of a magnetic field may be measured by placing a semiconducting material, or Hall generator, within a magnetic field. In a typical Hall device, two electrodes are attached to opposite ends of a thin slice of semiconducting material, for example, germanium, through which a current is passed. Two additional sensing or "voltage" leads are attached to the semiconducting material in the plane of the current flow at right angles to the direction of current flow. When a magnetic field, having a component perpendicular to the plane of current flow is superimposed on the Hall device, a voltage known as the Hall voltage is generated between the Hall voltage leads. This Hall voltage is proportional to the product of the current passing through the Hall device times the intensity of the magnetic field in a direction perpendicular to the plane of the current flow. If a known current is passed through the Hall device, measurement of the Hall voltage provides a measure of the unknown magnetic field strength. It is also possible, moreover, to provide regulation of a static D.C. magnetic field generated by an electromagnet utilizing the Hall generator as a magnetic field probe. Hall crystals may be constructed so that there is no Hall voltage temperature coefficient at a particular magnetic field strength by means of doping the Hall crystal, that is, the temperature dependence of the Hall voltage may be eliminated for a given magnetic field strength. The temperature coefficient of the Hall voltage, however, depends on the magnetic field strength, so that in prior art devices it has been necessary to utilize magnetic field responsive resistors, for example, or other external compensation of the Hall sensor.

Prior art devices have utilized various schemes for electronic compensation in order to eliminate spurious unbalance voltages at zero magnetic field strength, and in order to correct for temperature and field dependent changes in the semiconductor internal resistance and the temperature dependence of the Hall voltage. Compensation is typically provided, for example, by applying to the Hall voltage leads a bucking voltage generated across a voltage dividing device. Although such techniques permit the utilization of relatively cheap unbalanced Hall sensors, they have the disadvantage that the Hall voltage is not reliable measure of the magnetic field strength at high magnetic fields because of the dependence of the Hall voltage upon magnetic field strength. Even where Hall sensors are doped to eliminate temperature dependence of the Hall voltage at one value of magnetic field strength the apparent Hall voltage varies with temperature because the Hall crystal semiconductor bulk resistance is temperature dependent. Since the crystal's internal IR drop, which opposes the Hall voltage, varies with temperature, the apparent Hall voltage varies with temperature.

One object of the present invention is to provide a simple apparatus accurately regulating a current-controlled electromagnet throughout a very wide range of magnetic field strengths.

One feature of the present invention, therefore, is the provision of a Hall-effect sensor in combination with a null circuit arrangement whereby measurement for regulation of both small and large magnetic fields may be accomplished accurately in a known calibrated fashion by the same sensing device.

One difficulty with prior art electronic compensation of Hall-effect sensors, is that the accuracy and reliability of operation depends upon stability of external current supply means and loading factors. Variations in the output of the external oscillator which supplies current to the Hall sensor current leads and temperature-dependent variations in the internal resistance of the Hall sensor produce variations in the Hall voltage destructive of the steady state linear relation between magnetic field strength and the Hall voltage.

In order to achieve accurate magnetic field regulation utilizing a Hall-effect sensor, for example, it is necessary that the Hall voltage be independent of conditions external to the field itself in order that the Hall voltage may vary linearly according to the absolute value of the magnetic field strength. It is necessary, moreover, that the current through the Hall sensor be maintained constant or that the change in current due to external fluctuations and changes in the bulk resistance of the sensor be exactly compensated.

Another feature of the present invention, therefore, is provision of a novel null circuit arrangement in combination with a compensated Hall-effect sensor for obtaining an instantaneous Hall voltage in variable linear accordance with the strength of an unknown magnetic field and for comparing the Hall voltage with a reference voltage derived from a calibrated range of resistances in order to produce an error signal for controlling the field-generating current of an electromagnet. By means of this unique arrangement, extremely high field regulatory stabilities may be obtained of the order of 1 part in $10^7$ for short periods of time, for example.

Another object of the present invention is to provide a simple technique of measuring magnetic field strengths utilizing Hall-effect sensors, in which the accuracy of measurement is not affected by changes in external voltage, and loading.

Another feature of the present invention, therefore, is provision of means for determining the strength of an unknown magnetic field by potentiometric null comparison of the Hall voltage of a Hall-effect sensor disposed within the unknown magnetic field with a reference voltage generated across a calibrated range of resistances corresponding to a known range of magnetic field strengths, in which variations in the voltage applied to the Hall sensor produce like reference voltage deviations and Hall voltage deviations which are mutually cancelled when the reference voltage and Hall voltage are nulled, and in which variations in the current supplied to the Hall sensor affect the reference and Hall voltages alike.

Another object of the present invention is to provide an arrangement for measuring magnetic field strengths utilizing Hall-effect sensors in which the accuracy of measurement is not affected by changes in the external temperature to which the Hall sensor is exposed.

Another feature of the present invention, therefore, is provision of means for measuring the strength of a magnetic field by nulling a variable reference voltage with the Hall voltage output of a Hall-effect sensor which has a positive Hall voltage temperature coefficient and is compensated by means of a resistive element so that deviations in the Hall voltage due to temperature variations are substantially eliminated.

These and other features and advantages of the present invention will be more apparent after a perusal of the following specification taken in connection with the accompanying drawings wherein the same numeral is used in the various figures for the same or analogous element, and:

FIG. 1 is a schematic drawing of a Hall sensor null circuit arrangement in accordance with the present invention, FIG. 2 is a schematic drawing of a Hall sensor null circuit arrangement and sweep circuit arrangement for operation in conjunction therewith in accordance with the present invention, FIG. 3 shows a field regulator in block diagram form for control of an electromagnet in accordance with the present invention, and FIG. 4 shows a gaussmeter and/or magnetometer for measurement of magnetic fields in accordance with the present invention.

Referring now to FIG. 1, the Hall-effect sensor 1, consisting of a thin wafer of semiconducting material such as germanium, to which current leads 2 and 3 are affixed, is supplied with A.-C. voltage from an oscillator (not shown) across terminals 4 and 5. This voltage produces a current flow between the current leads 2 and 3 of the Hall-effect sensor 1. Hall voltage leads 6 and 7 are affixed to the Hall sensor in the plane of the current flow. Whenever a magnetic field having a component in a direction perpendicular to the plane of the current flow is superimposed on the Hall sensor, a voltage is produced across terminals 6 and 7 and across field coil 8, which voltage is transformed by isolation transformer 9 and applied to coil 10 of the output circuit.

Whenever it is desired to determine the magnitude of a magnetic field which is superimposed upon the Hall sensor, the voltage across voltage divider 11 comprising high precision resistor 12, which is connected in series with the current leads 2 and 3 of the Hall sensor, and variable capacitor 13, is divided variably, part of this voltage being applied to reference coil 14, transformed by means of isolation transformer 15 and applied to output coil 16. By varying the calibrated division of the voltage across resistor 12 in a known fashion, the voltage across coil 16 is adjusted so that it is equal and in series opposition to the voltage across coil 10 so that when the reference voltage across reference coil 14 is equal to the Hall voltage across field coil 10, a null signal is produced across the output terminals 17 and 18. This null signal may be detected by well known detection means. When, however, the reference voltage across reference coil 14 is larger or smaller than the Hall voltage, an error signal is produced across terminals 17 and 18 in variable accordance with the difference between the reference voltage and the unknown Hall voltage. This error signal may be amplified and used to drive a servomechanism which may control the current level of an electromagnet, for example. Alternatively, the error signal may be read on a null meter and the precision resistance 12 adjusted to produce a null signal so that an unknown magnetic field strength may be determined precisely.

Since the output of the voltage divider 11 may be calibrated in units of magnetic field strength, a desired magnetic field setting may be established corresponding to a reference voltage across coil 14 with which the Hall voltage is compared. Thus, if the device is utilized in conjunction with a servo magnet control device, the current controlling the field between the pole pieces of an electromagnet may be increased or decreased until the magnetic field between the pole pieces is equal to the desired reference magnetic field strength.

An advantage of applicant's device is that once a null voltage is established across output terminals 17 and 18, thereby indicating that the reference voltage is equal to the Hall voltage, variations in the voltage across terminals 4 and 5 or variations in the load across terminals 17 and 18 have no effect upon the null signal. Although a variation in the input voltage will produce a variation in the Hall voltage, this variation is also produced with equal magnitude in series opposition across coil 14 so that the voltage null across output coils 10 and 16 remains undisturbed.

The use of two identical isolation transformers 9 and 15 is advantageous, moreover, because any errors due to changes in transformer ratios is cancelled when the voltages across coils 10 and 16 are nulled. Similarly, the use of identical variable capacitors 13 and 13' advantageously permits cancellation of phase and amplitude errors due to loading of the variable resistor 12 by the reactance of transformer 15. All errors due to external power supply fluctuations and loading are thus effectively cancelled by means of this unique balanced circuit arrangement.

Variations in the Hall voltage due to temperature dependence of the Hall voltage and the temperature dependence of the semiconductor bulk resistance over a wide range of magnetic field strengths are eliminated by internal and external compensation of the Hall sensor. The Hall-effect sensor 1 has a positive Hall voltage temperature coefficient of the order of $3 \times 10^{-4}/^\circ$ C. When a precision resistor 20, having a resistance of 1300 ohms, for example, is connected across the Hall voltage terminals 6 and 7 in parallel with an output impedance of 100Ω, for example, the change in the Hall voltage due to Hall voltage temperature dependence may be made equal to the change in the internal semiconductor IR drop due to the temperature dependence of the semiconductor bulk resistance, with the result that the voltage across field coil 8 does not vary due to temperature changes.

The required value of $R_{20}$ can easily be calculated by applying conventional circuit techniques to the series circuit consisting of the equivalent Hall voltage generator $V_H$, the semiconductor bulk resistance $R_i$ and resistor $R_{20}$. In order to maintain the voltage $V_{OUT}$ across $R_{20}$ constant when temperature changes, the current I in the series circuit must remain constant, since $I = V_{OUT}/R_{20}$ and $R_{20}$ has a fixed value irrespective of temperature.

If the temperature changes by an amount $\Delta T$, then the charge in the equivalent Hall voltage is $\Delta V_H = C_V \Delta T V_H$ and the change in the semiconductor bulk resistance is $\Delta R_i = C_R \Delta T R_i$ where $C_V$ and $C_R$ are the normalized temperature coefficients of Hall voltage and semiconductor bulk resistance, respectively. Then in order to have no change in $V_{OUT}$, $I \Delta R_i = \Delta V_H$ or by substituting for I, $\Delta R_i$ and $\Delta V_H$, $$\left(\frac{V_H}{R_{20}+R_i}\right)(C_R \Delta T R_i) = (C_V \Delta T V_H) \text{ and } R_{20} = R_i \left(\frac{C_R}{C_V} - 1\right)$$

Referring now to FIG. 2, a Hall sensor null circuit arrangement of FIG. 1 is shown together with a sweep circuit arrangement, the combination being adapted for controlling the current level of an electromagnet suitable for use in nuclear magnetic resonance or electron paramagnetic resonance experiments, for example. Input voltage is applied to terminals 4 and 5 and is divided between a Hall sensor field-sensing null circuit 21 and a sweep circuit 22. The sweep circuit arrangement 22 consists of several resistors 23 in series, which produce a voltage across input sweep coil 24. This voltage is applied by isolation transformer 25 to sweep output coil 26, which is centrally tapped by output terminal 18. Resistor 27 which is adjustably tapped by variable tap 10' is arranged in series relation to coil 26 forming bridge 28. When an oscillatory voltage is applied to input terminals 4 and 5, no voltage is applied to output terminals 17 and 18 if variable tap 10' is centrally adjusted, provided that no magnetic field is superimposed on the Hall sensing device productive of an output error signal. The bridge 28, however, may be unbalanced by moving variable tap 10' off center of resistor 27 by means of a drive mechanism (not shown), for example, so that an unbalance sweep voltage may be applied to output terminals 17 and 18. Thus a time-varying voltage may be superimposed on the stabilizing difference voltage for producing modulation of the magnetic field of an electromagnet suitable for use in connection with well-known detection techniques in magnetic resonance applications, for example. Thus a steady state D.-C. static magnetic field generated between the pole pieces of an electromagnet may be swept slowly and continuously in a predetermined fashion while the value of the static field is stabilized at a desired level.

Referring now to FIG. 3 there is shown in block diagram form a Hall field sensing control device and magnet power supply for regulating and stabilizing the magnetic field of an electromagnet with a high degree of precision.

The Hall field sensing control device 29 consists of a power supply 30, an oscillator 31, a power amplifier 32, a Hall sensor null sweep circuit 33 comprising the Hall sensor null circuit 21 and sweep circuit 22 shown in FIG. 2, an error amplifier 34, a phase detector 35, and a stabilizer 36. The power supply 30, having an 18-volt output, for example, is utilized to energize an A.-C. oscillator 31, is amplified by means of power amplifier 32 and is then applied to the input terminals of the Hall sensor null sweep circuit 33.

A reference voltage is established across coil 14 of FIG. 2 as explained herebefore by setting a dial (not shown) which is calibrated directly in units of magnetic field strength at the desired value of magnetic field strength. If the magnetic field generated between the pole pieces of electromagnet 45 is different from the desired magnetic field strength, an error signal equal to the difference between the reference voltage and the Hall voltage or some transformer ratio multiple of this difference voltage is produced across the output terminals of the Hall sensor null sweep circuit arrangement 33. This error signal is amplified by means of error amplifier 34, an A.-C. amplifier operating at 1300 cycles, for example, the output of error amplifier 34 being then introduced into phase detector 35 where it is compared with the output of oscillator 31. The difference in phase between the output signals from oscillator 31 and amplifier 34 determines the polarity of the signal which is introduced into stabilizer 36, which prevents oscillations from occurring within the Hall field sensing control device.

The output of stabilizer 36 is thereupon introduced into the magnet power supply 37, being amplified in driver amplifier 38 thereof. The output error signal from driver amplifier 38 is then introduced into pass bank 39 which consists of numerous transistors 40 arranged in parallel circuit fashion or which alternatively may consist of numerous tubes connected in parallel. This output error signal is applied in a known fashion to the base elements 41 of these transistors. The emitter elements 42 of these transistors are supplied with D.-C. current.

D.-C. current for supplying emitter elements 42 is produced by rectifying and filtering a tri-phase A.-C. input current in rectifier-filter 43. The D.-C. current output of the rectifier-filter 43 conveniently may be fed back to the driver amplifier 38 through a circuit arrangement 44 consisting of capacitive and resistance elements which in combination serve to eliminate A.-C. ripple and produce better high frequency response.

The base elements 41 of the pass transistors 40 may be biased to provide for a known flow of current to magnet 45 by unbalancing the output of the Hall sensor null sweep circuit arrangement 33 very slightly, for example, to one part in $10^5$. When an amplified error signal is applied to the base elements 41 of the transistors 40, this signal serves to pass more or less current through the transistors so that the current passing through the magnet coils of magnet 45 is altered until there is no longer an error signal biasing the base elements 41. Once the desired magnetic field strength has been established, any subsequent deviations of the magnetic field generated by electromagnet 45 due to current supply fluctuations or the like will produce an error signal which, after amplification, will bias the base elements of the pass bank transistors to pass more or less current to the magnet coils until the current level corresponding to the desired magnetic field magnitude is re-established.

The Hall-effect field regulator described herein is especially useful for controlling the magnets utilized in nuclear magnetic resonance devices where a large highly stable homogeneous field is required. Magnetic field regulation to 1 part in 10 million or better may be achieved by means of this unique Hall effect field regulator. Extremely high field stabilities of the order of 1 part in $10^6$ for 1 hour are produced.

Referring now to FIG. 4 there is shown a gaussmeter for measuring magnetic fields ranging up to 50 kilogauss, for example, and/or a magnetometer for measuring small magnetic fields ranging down to 100 milligauss, for example, utilizing a modified Hall field sensing control device. The Hall sensor null circuit 21 shown in FIGS. 1 and 2 may be used to measure the magnitude of an unknown magnetic field very accurately. A variable reference resistance productive of a reference voltage, which may be read on an accurately calibrated dial (not shown) directly in units of magnetic field strength, is varied until a null signal is obtained across the output terminals of the Hall sensor null circuit 21. So long as the magnetic field strength observed on the null meter 46 is different than the unknown magnetic field strength, an error signal is produced which may be amplified in error amplifier 34, phase compared in phase detector 35, and read in null meter 46. Expanded scale reading on null meter 46 may be accomplished by means of a gain control arrangement 47 so that a null signal may readily be observed with comparable meter sensitivity throughout a wide range of magnetic field strengths.

When this field sensing device is utilized as a gaussmeter, accuracies characteristically of the order of 0.01% are possible for high field strengths, for example. When the device is utilized as a magnetometer, the component of the earth's magnetic field in a given direction may be measured, for example, with accuracies of the order of 0.1%. The Hall-effect sensing wafer 1 may be oriented, moreover, so that the face of the wafer is perpendicular to the direction of the earth's magnetic field by means of a mechanical rotator (not shown), for example.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. An apparatus for sensing the strength of a magnetic field with very high precision comprising Hall-effect sensing means adapted to generate a Hall voltage when disposed within a magnetic field in variable accordance therewith and high precision voltage dividing means being connected in series circuit relation to at least one current lead of said Hall sensing means, a variable calibrated reference voltage being generated across said dividing means in series opposing fashion to said Hall voltage to produce a difference signal therebetween whereby a voltage equal to the Hall voltage is derived and deviations from the steady state linear relation of said magnetic field strength to said Hall voltage due to external fluctuations in supply voltage and circuit loading are effectively cancelled, wherein said voltage dividing means comprises a first high precision resistor, and said Hall sensing means has two voltage leads oppositely disposed in the plane of said at least one current lead at right angles thereto and further including reference coil means connected in parallel circuit relation across said first resistor, field coil means connected across said Hall voltage leads, and transformer means for applying said reference voltage and said Hall voltage in series opposition therebetween.

2. An apparatus according to claim 1 wherein said transformer means comprise identical 1st and 2nd isolation transformers and further including identical 1st and 2nd output coil means connected in series fashion, said reference voltage generated across said reference coil means being applied by said 1st isolation transformer to said 1st output coil means and said Hall voltage generated across said field coil means being applied by said 2nd isolation transformer to said 2nd output coil means in series opposition therebetween.

3. An apparatus according to claim 2 and further including 2nd resistive means connected in parallel fashion across said Hall voltage leads for substantially eliminating temperature dependence of the voltage applied to said field coil means.

4. An apparatus according to claim 3 and further including variable capacitive means connected in parallel fashion across said Hall voltage leads and variable capacitive means connected across said 1st resistive means for providing compensation of the output impedance of said first resistor throughout a wide range of magnetic field strengths.

5. An apparatus according to claim 4 and further including a null meter connected in series with said 1st and 2nd output coil means.

6. An apparatus for simultaneously stabilizing the strength of a magnetic field generated by an electromagnet at a steady state value and superimposing a predetermined field strength variation on said steady state value, comprising: Hall effect semiconducting means generating a Hall voltage when disposed within a magnetic field in variable accordance therewith, and potentiometric means balancing said Hall voltage against a calibrated reference voltage and producing a difference signal for stabilizing the magnetic field generated by said electromagnet, and means of unbalancing said difference signal for varying said magnetic field in a predetermined manner.

7. An apparatus for measuring the strength of a magnetic field with high precision comprising a Hall-effect semiconducting wafer having two current leads and two Hall voltage terminals and being adapted to generate a Hall voltage across said terminals when said device is disposed within a magnetic field having a component perpendicular to the plane of said wafer, said current leads being oppositely disposed in said wafer plane and said Hall voltage terminals being oppositely disposed in said wafer plane at right angles to said current leads, a 1st precision resistive element being connected to one of said current leads in series relation thereto, said resistive element being adapted to divide an input voltage applied to said element productive of a reference voltage, a 1st variable capacitor and a reference coil, said capacitor and said input coil being connected in parallel relation therebetween across said 1st resistive element, a 2nd variable capacitor, a 2nd resistive element, and a field coil connected in parallel relation therebetween across said Hall voltage terminals; two identical isolation transformers for applying said reference voltage and said Hall voltage to 1st and 2nd output coils respectively, said output coils being series connected and said reference voltage and said Hall voltage being series opposed to produce a difference or null signal therebetween, whereby deviations from the steady state linear relation of said Hall voltage to said magnetic field strength owing to variations in the reactances loading Hall-effect means, in the voltage applied externally to said Hall-effect means, in the bulk resistance and magneto-resistance of said Hall-effect means, and in the temperature dependence of said Hall voltage with changing magnetic field strength, are effectively cancelled.

8. An apparatus according to claim 7 and further including a sweep circuit arrangement comprising 1st sweep resistive means, 1st sweep input coil means and a transformer means for applying a sweep voltage generated across said resistive means to a bridge circuit.

9. An apparatus according to claim 8 wherein said bridge circuit comprises sweep output coil means adapted to be centrally tapped and 2nd sweep resistive means adapted to be variably tapped for producing a difference bridge voltage.

10. An apparatus according to claim 9 wherein said 2nd resistive means is tapped by a driven variable tap connected in series with said 1st and 2nd output coil means for combining said difference bridge voltage with said difference or null signal.

11. Hall-effect field sensing means for sensing the strength of a magnetic field with high precision comprising, in combination, a power supply means for supplying an A.-C. oscillator, oscillator means for driving an A.-C. power amplifier, power amplifying means for supplying an alternating current to a field sensing null circuit arrangement, error amplifier means for amplifying a difference signal generated by said field sensing null circuit arrangement, phase detecting means for comparing the phase of an output signal from said oscillator means with the phase of an output signal from said error amplifier, and a field sensing null circuit arrangement comprising:

(1) a Hall effect semiconducting wafer for sensing the strength of a magnetic field having two current leads and two Hall voltage terminals, said current leads being oppositely disposed in said wafer plane and said Hall voltage terminals being oppositely disposed in said wafer plane at right angles to said current leads, (2) a 1st precision resistive element being connected to one of said current leads in series relation thereto, said resistive element being adapted to divide an input voltage applied to said element productive of a reference voltage, (3) a 1st variable capacitor and a reference coil, said capacitor and said input coil being connected in parallel relation therebetween across said 1st resistive element, (4) a 2nd variable capacitor, a 2nd resistive element, and a field coil connected in parallel relation therebetween across said Hall voltage terminals; two identical isolation transformers for applying said reference voltage and said Hall voltage to 1st and 2nd output coils respectively, said output coils being series connected and said reference voltage and said Hall voltage being series opposed to produce a difference signal null therebetween.

12. An apparatus according to claim 11 and further including stabilizing circuit means for preventing undesirable oscillations within said Hall sensing control device.

13. An apparatus according to claim 12 and further including a magnet power supply comprising driver amplifier means for amplifying an output signal from said stabilizing means, a pass bank comprising a plurality of transistors connected in parallel and controlling the passage of current therethrough to an electromagnet, and a rectifier filter for producing a D.-C. current supply for said transistors.

14. An apparatus according to claim 11 and further including a meter for observing said difference signal null.

15. An apparatus according to claim 14 and further including gain control circuit means for increasing the sensitivity of said meter throughout a wide range of magnetic field strengths.

16. Apparatus for sensing the strength of a magnetic field comprising Hall-effect semiconducting means having two current leads and two Hall voltage terminals, said means having a positive Hall voltage temperature coefficient and generating a Hall voltage across a resistive element, said resistive element being connected across said Hall voltage terminals and having a selected fixed value such that the temperature dependent change of the Hall voltage is equal to the temperature dependent change of the internal semiconductor IR drop whereby the apparent Hall voltage generated across said resistive element is substantially independent of temperature variations.

17. An apparatus according to claim 16, wherein said Hall-effect semiconducting means comprises germanium and has a positive Hall voltage temperature coefficient equal to $3 \times 10^{-4}/°$ C. and said resistive element has a temperature coefficient of resistance much smaller than the temperature coefficient of the Hall voltage and has a resistive value of 1300Ω for a Hall voltage output impedance of 100Ω.

18. Apparatus for sensing the strength of a magnetic field comprising: a Hall effect sensing means; a nulling circuit coupled to said sensing means, including a variable resistance serving as a reference connected in series with said sensing means; a first output circuit coupled to such reference variable resistance for receiving a reference signal from said resistance; a second output circuit coupled to said Hall sensing means for receiving a Hall voltage signal; said first and second output circuits being connected so that when said reference signal is substantially equal to said Hall voltage signal, a null output signal is produced.

19. Apparatus as in claim 18 wherein said first and second output circuits include first and second coils respectively, said coils being connected in series opposition.

References Cited by the Examiner
UNITED STATES PATENTS

| | | | |
|---|---|---|---|
| 2,906,945 | 9/1959 | Weiss | 324—45 |
| 2,946,955 | 7/1960 | Kuhrt | 324—45 |
| 2,959,733 | 11/1960 | Koch et al. | 324—45 |

RICHARD B. WILKINSON, *Primary Examiner.*